US009542683B2

United States Patent
Kalinin et al.

(10) Patent No.: US 9,542,683 B2
(45) Date of Patent: Jan. 10, 2017

(54) SYSTEM AND METHOD FOR PROTECTING ELECTRONIC MONEY TRANSACTIONS

(71) Applicant: Kaspersky Lab ZAO, Moscow (RU)

(72) Inventors: Alexander V. Kalinin, St. Petersburg (RU); Sergey V. Dobrovolsky, Moscow (RU); Andrey Y. Solodovnikov, Kaluga (RU); Vladislav V. Martynenko, St. Petersburg (RU); Roel Schouwenberg, New York, NY (US)

(73) Assignee: AO Kaspersky Lab, Moscow (RU)

( * ) Notice: Subject to any disclaimer, the term of this patent is extended or adjusted under 35 U.S.C. 154(b) by 49 days.

(21) Appl. No.: 14/735,583

(22) Filed: Jun. 10, 2015

(65) Prior Publication Data

US 2016/0117671 A1    Apr. 28, 2016

(30) Foreign Application Priority Data

Oct. 22, 2014    (RU) ................................ 2014142363

(51) Int. Cl.
G06Q 40/00    (2012.01)
G06Q 20/36    (2012.01)

(52) U.S. Cl.
CPC ...... G06Q 20/3678 (2013.01); G06Q 20/3674 (2013.01)

(58) Field of Classification Search
CPC ....... G06F 21/56; H04L 63/145; G06Q 20/40; G06Q 20/20; G06Q 20/4016

(Continued)

(56) References Cited

U.S. PATENT DOCUMENTS 6,016,484 A * 1/2000 Williams ............... G06Q 20/00
                                                       235/375
7,530,106 B1 * 5/2009 Zaitsev ................. G06F 21/577
                                                       713/164

(Continued)

FOREIGN PATENT DOCUMENTS

GB          2510430 A       6/2014
WO     2013082190 A1        6/2013

OTHER PUBLICATIONS

Nuño Rodrigo / Laura Salces , 14 claves sobre el irresistible auge de Bitcoin, Apr. 13, 2013, Prisacom, Spain.*

(Continued)

*Primary Examiner* — Kambiz Abdi
*Assistant Examiner* — Michael W Anderson
(74) *Attorney, Agent, or Firm* — Arent Fox LLP; Michael Fainberg (57) ABSTRACT

Disclosed are systems and methods for protecting electronic money transactions from fraud and malware. An exemplary method include scanning a computer to detect software objects associated with electronic money that includes at least one of a wallet configured to store electronic money, an electronic money generating application, and data including an interaction history with an electronic exchange for electronic money; identifying and adjusting electronic money security modules configured to provide data security to the detected software objects associated with the electronic money; and executing, by the adjusted electronic money security modules, at least one electronic money transaction involving the electronic money. In one aspect, the electronic money security modules include a wallet protection module, a malware detection module, and a traffic control module.

14 Claims, 8 Drawing Sheets (58) Field of Classification Search
USPC .................................................. 705/4, 35–45
See application file for complete search history.

(56) References Cited

U.S. PATENT DOCUMENTS

| | | | |
|---|---|---|---|
| 8,001,606 B1 * | 8/2011 | Spertus ................. | G06F 21/564 709/203 |
| 8,732,472 B2 | 5/2014 | Grebennikov et al. | |
| 2006/0218651 A1 * | 9/2006 | Ginter .................... | G06Q 40/12 726/27 |
| 2007/0226807 A1 * | 9/2007 | Ginter .................... | G06F 21/10 726/27 |
| 2013/0036048 A1 * | 2/2013 | Campos et al. ................ | 705/41 |
| 2014/0122343 A1 * | 5/2014 | Einav ................. | G06Q 20/4016 705/67 |

OTHER PUBLICATIONS

Nuno Rodrigo / Laura Salces, 14 claves sobre el irresistible auge de Bitcoin, Apr. 13, 2013, Prisacom, Spain.*
Kaspersky Lab, Jan. 23, 2013, web.archive.org/web/20130123111308/http://www.kaspersky.com/downloads/pdf/kaspersky_lab_whitepaper_safe_money_eng_final.pdf.*

* cited by examiner

SYSTEM AND METHOD FOR PROTECTING ELECTRONIC MONEY TRANSACTIONS

CROSS-REFERENCE TO RELATED APPLICATIONS

This application claims the benefit of priority under 35 U.S.C. 119(a)-(d) to a Russian Application No. 2014142363 filed on Oct. 22, 2014, which is incorporated by reference herein in its entirety.

FIELD OF TECHNOLOGY

The present disclosure related generally to the field of computer security, and more specifically, to systems and methods for protecting electronic money transactions from fraud and malicious use.

BACKGROUND

At present, more and more attention is paid to so-called electronic money ("e-money"), which provides an electronic form of monetary liabilities of the issuer and is available to the user on electronic media (e.g., the Internet). Electronic money can be implemented using smart cards, networks or the like. Examples of e-money can be PayPal® or Yandex® money.

More recently, there has been another type of e-money that is called cryptocurrency. Cryptocurrency is a type of e-money that has its emissions and accounting based on cryptographic methods. Cryptocurrencies typically feature decentralized control among its users (as opposed to a centralized electronic money systems, such as PayPal®) and a public ledger which records transactions.

Almost all types of e-money have common features. The main feature includes the use of a so called electronic "wallet", which is a specialized program developed for storage and exchange of e-money via synchronization with other users or the issuer. Another distinctive attribute can be an electronic exchange where users can exchange their e-money for other types of electronic currency or real money (e.g., fiat money). With regard to cryptocurrency, the term "mining" refers to when a cryptocurrency is generated using a resource-intensive algorithm performing on modern CPUs or GPUs or even Application Specific Integrated Circuit ("ASIC") boards. In particular, within cryptocurrency systems, the safety, integrity and balance of the ledger are maintained by a community of mutually distrustful parties (i.e., "miners"), who are members of the general public using their computers to help validate and timestamp transactions adding them to the ledger in accordance with a particular timestamping scheme for the cryptocurrency systems.

With the increasing popularity of conducting transactions using e-money, various hackers and the like have started using social engineering methods to steal passwords from wallets or even distribute malicious programs, such as Trojans, to generate cryptocurrency from unsuspecting users. Electronic exchanges have also become the object of attention of scams that try to steal passwords to access both the electronic exchange and the user data stored therein.

Accordingly, there is a need for system and method that provides security for e-money transactions at various stages from the generation of e-money to its exchange.

SUMMARY

Disclosed are different aspect of systems, methods and computer program products for protecting transactions with electronic money from fraud and malicious use.

According to one aspect, a method for controlling electronic money transactions. The exemplary method includes scanning a computer to detect software objects associated with electronic money that includes at least one of a wallet configured to store electronic money, an electronic money generating application, and data including an interaction history with an electronic exchange for electronic money; identifying and adjusting electronic money security modules configured to provide data security to the detected software objects associated with the electronic money; and executing, by the adjusted electronic money security modules, at least one electronic money transaction involving the electronic money, wherein the electronic money security modules include one of at least a wallet protection module, a malware detection module, and a traffic control module.

According to another aspect, the method includes tracking and protecting, by the wallet protection module, an execution of the wallet to store the electronic money and a transfer of the electronic money.

According to another aspect, the method includes detecting, by the wallet protection module, resources used by the wallet to store the electronic money and a transfer of the electronic money.

According to another aspect, the resources used by the wallet include wallet.dat file.

According to another aspect, the method includes controlling, by the wallet protection module, access to the resources used by the wallet to store the electronic money and a transfer of the electronic money.

According to another aspect, the method includes detecting, by the malware detection module, malicious programs that can intervene with electronic money transaction.

According to another aspect, the method includes scanning, by the traffic control module, all network traffic associated with the electronic money.

According to another aspect, the method includes scanning, by the traffic control module, network traffic associated with the electronic exchange for the electronic money.

According to another aspect, a system is disclosed for controlling electronic money transactions. According to one aspect, the system includes a hardware processor configured to scan a computer to detect software objects associated with electronic money that includes at least one of a wallet configured to store electronic money, an electronic money generating application, and data including an interaction history with an electronic exchange for electronic money; identify and adjusting electronic money security modules configured to provide data security to the detected software objects associated with the electronic money; and execute, by the adjusted electronic money security modules, at least one electronic money transaction involving the electronic money, wherein the electronic money security modules include one of at least a wallet protection module, a malware detection module, and a traffic control module.

According to yet another aspect, a non-transitory computer readable medium storing computer executable instructions for controlling electronic money transactions is disclosed. According to one aspect, the non-transitory computer readable medium includes instructions for scanning a computer to detect software objects associated with electronic money that includes at least one of a wallet configured to store electronic money, an electronic money generating application, and data including an interaction history with an electronic exchange for electronic money; identifying and adjusting electronic money security modules configured to provide data security to the detected software objects associated with the electronic money; and executing, by the adjusted electronic money security modules, at least one electronic money transaction involving the electronic money, wherein the electronic money security modules include one of at least a wallet protection module, a malware detection module, and a traffic control module.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for providing security for electronic money transactions. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
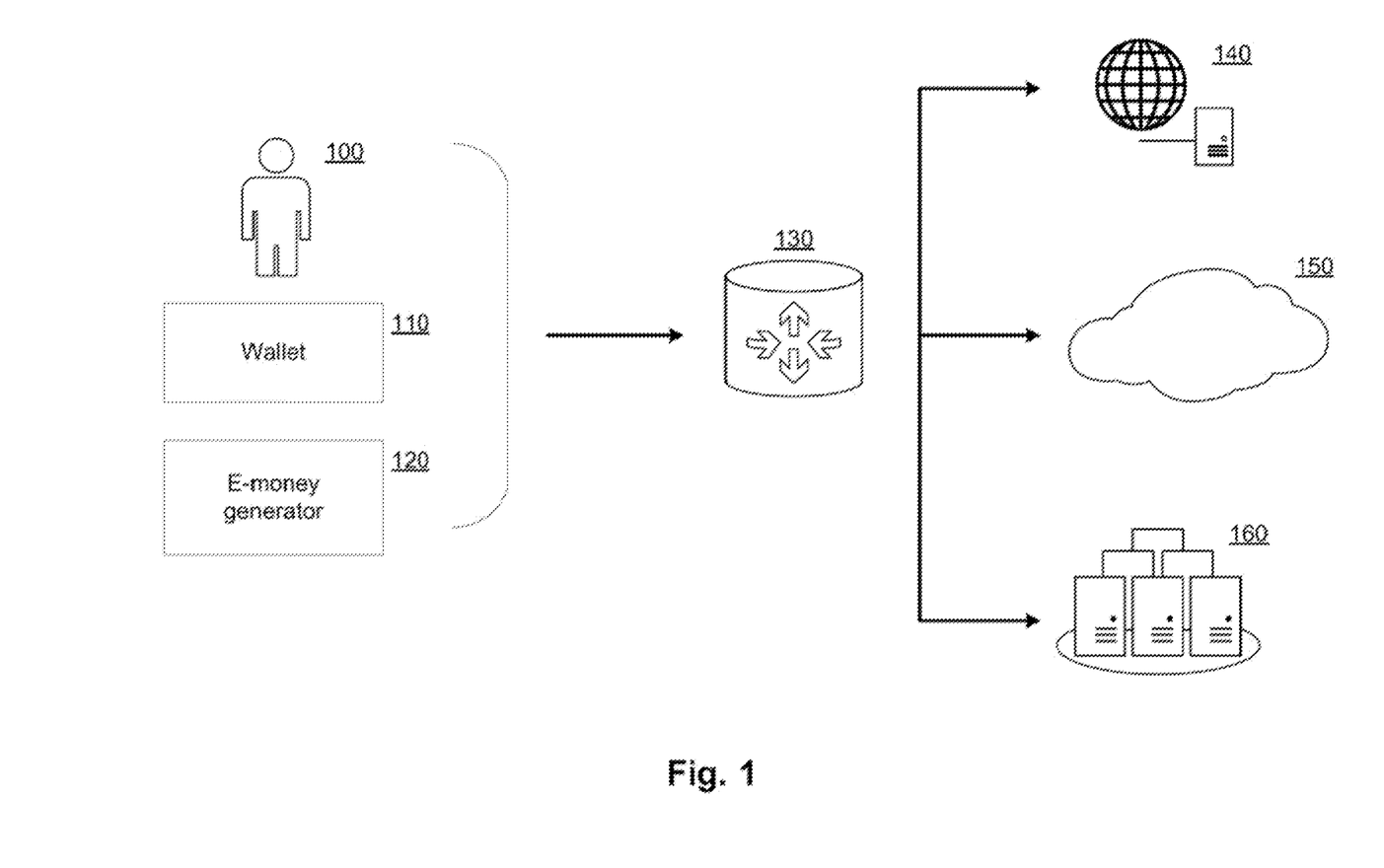
FIG. 1 illustrates a diagram for an electronic money ("e-money") transaction.

FIG. 1 illustrates a diagram for an electronic money ("e-money") transaction. As shown, user 100 can access an electronic exchange 140 where he can exchange his e-money for real currency or transfer it to his wallet 110. Wallet 110 has access to e-money network 150 via an application programming interface ("API"), for example, which verifies all transactions with e-money. Verification can be approved from the issuer (in case of PayPal®) or from other e-money users (distributed verification is one of the features of cryptocurrency). User 100 can also use an e-money generator 120 (e.g., "bitcoin mining") that has access to central (i.e., a pool) server 160 that coordinates work of such applications 120 among network 150. Typically, the generation (mining) of e-money includes generation of blocks by miners with their applications 120. After the necessary amount of blocks are generated, the number of miners (including user 100) will be awarded e-money with respect to how many blocks each of them has generated. All data is passed through the network infrastructure 130, which includes various types of network hardware and software including network cards and routers and the bulk network equipment as would be understood to one skilled in the art.

Figure 2:
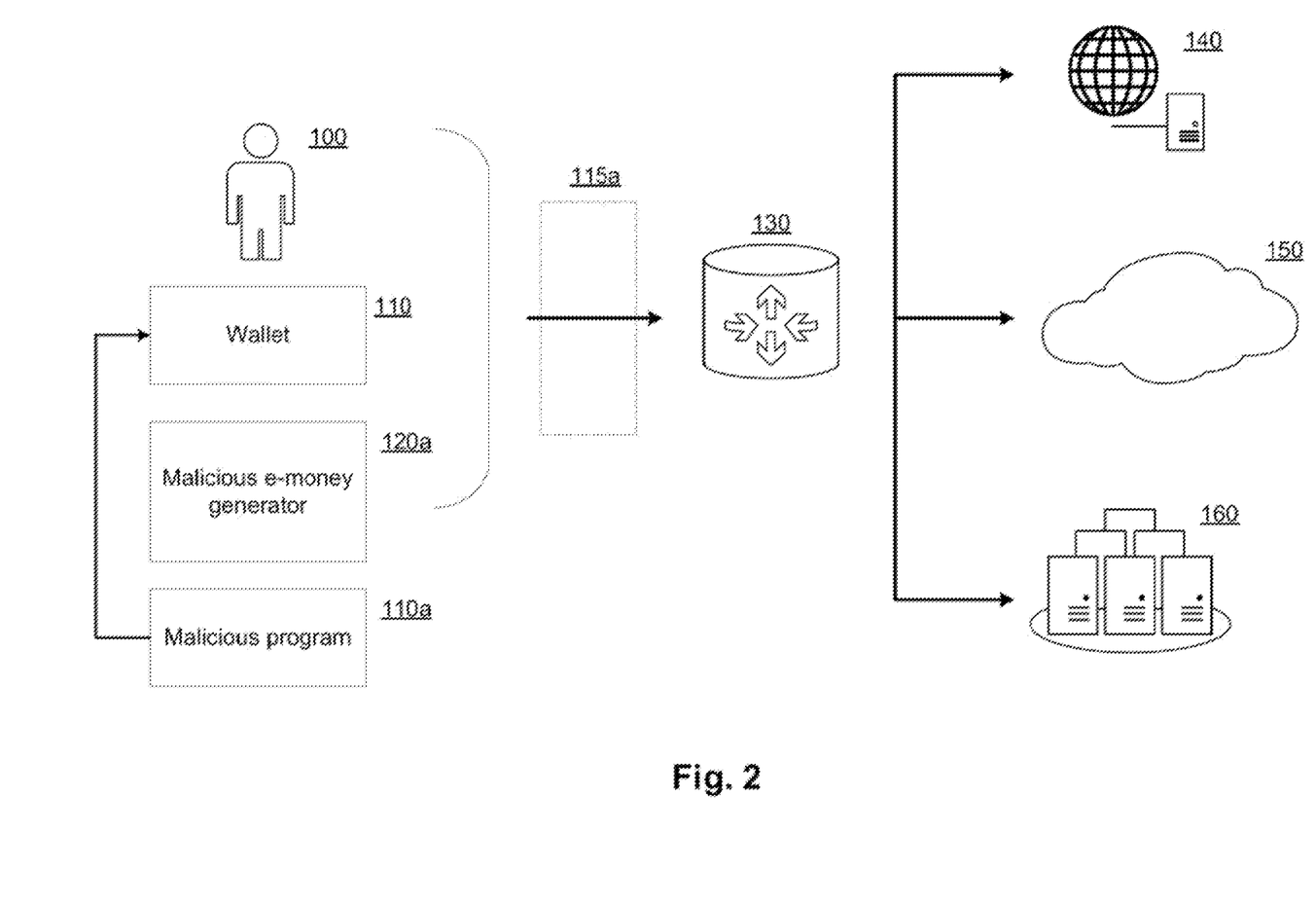
FIG. 2 illustrates a possible threat for e-money transactions.

FIG. 2 illustrates a possible threat for e-money transactions. For example, a malicious program 110a can access wallet 110 and steal user credentials (for example, for file wallet.dat commonly used in cryptocurrencies). Malicious e-money generator 120a can use computer's resources (for example, a CPU or GPU) without user consent. Another malicious action includes using a proxy server 115a, which can be installed on the user's computer, for example, which tracks user 100 interaction with electronic exchange 140 in order to fraudulently obtain user credentials (e.g., login and password) or performs fraudulent e-money transactions from the wallet 110. The system and method disclosed herein provides protection of e-money transaction on various levels/stages.

Figure 3:
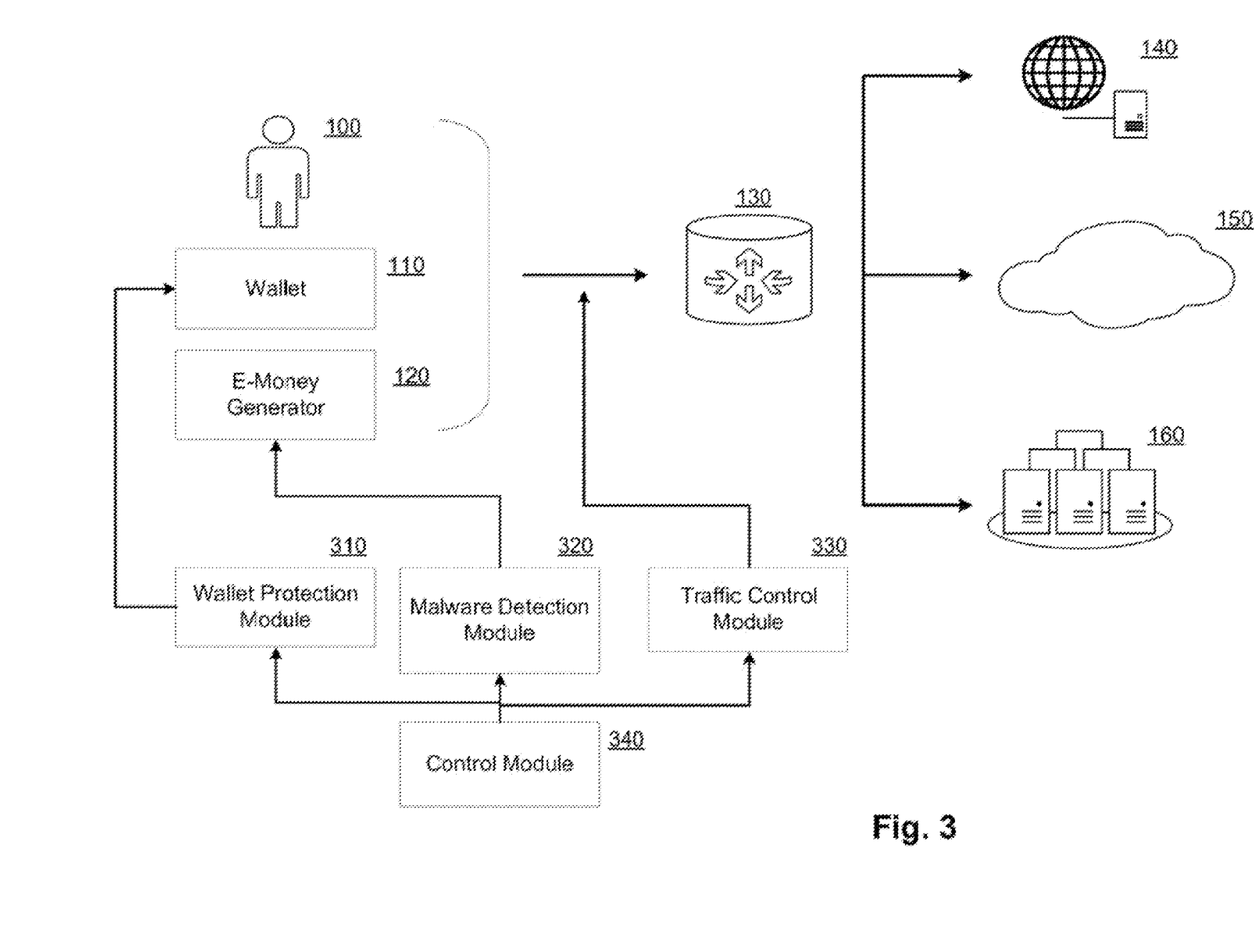
FIG. 3 illustrates a system for protecting an e-money transaction according to one aspect.

FIG. 3 illustrates a system for protecting an e-money transaction according to one aspect. As compared to FIG. 1, the system shown in FIG. 3 includes wallet protection module 310, malware detection module 320, traffic control module 330, and control module 340 (hereafter, collectively referred to as "electronic money security modules"). Wallet protection module 310 is designed to protect the process of an application of wallet 110 as well as other resources (e.g., files) used by the wallet 110. Malware detection module 320 performs antimalware functions, identifying the malicious application that is designed to generate e-money without user consent. Furthermore, malware detection module 320 can detect malicious applications that are attempting to access wallet 110 and its resources. Traffic control module 330 is designed to detect malicious actions/applications that conduct attacks such as "Man-in-the-middle" (MITM), for example, when trying to falsify user access to an electronic exchange 140. Control module 340 is configured to coordinate all modules 310-330, update the modules and their databases, add/remove functionality, automatically update settings and also search for objects that have any relationship to e-money: e-money generator 120, wallet 110, electronic exchange 140 history (for example, browser history if access was performed from browser).

Figure 4:
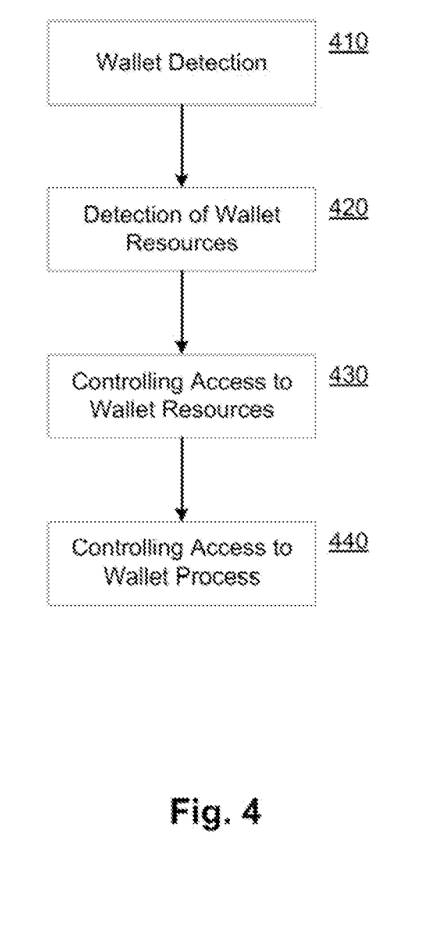
FIG. 4 illustrates an exemplary method for protecting a wallet transaction according to an exemplary aspect.

FIG. 4 illustrates an exemplary method for protecting a wallet transaction according to an exemplary aspect. As shown, in step 410, a computer is checked for a wallet 110 and its resources (for example, control module 340 can perform this task). In one aspect, the search may be based on finding executable files of wallet 110. In another aspect, the search may be based on using signatures or hashes for comparing checksums of files. Once the wallet 110 has been detected, various resources used by wallet 110 are searched in step 420. An example of such a resource can be file wallet.dat that stores information about cryptocurrency owned by the user. In step 430, wallet protection module 310 controls access to the resources detected in step 420. In one aspect, an example of such control may be prohibition to open the file wallet.dat by any application other than wallet 110. Also the list of resources may contain the following:

entries in the system registry, network storage media, cloud storage, portable storage devices (flash drives), smart phones, smart cards, and the like. Next, in step 440, wallet protection module 310 tracks and protects the execution of wallet application 110, controlling some aspects such as: (i) access to virtual memory of wallet application 110 (for example, via the hooking system of the WriteProcess-Memory function); (ii) network connections of wallet 110 in order to detect a possible use of a malicious proxy server 115*a*; (iii) clipboard; (iv) possible use of screenshots while running wallet application 110; (v) prohibiting control of the threads of wallet application 110; (vi) window messages; and (vii) setting hooks.

Figure 5:
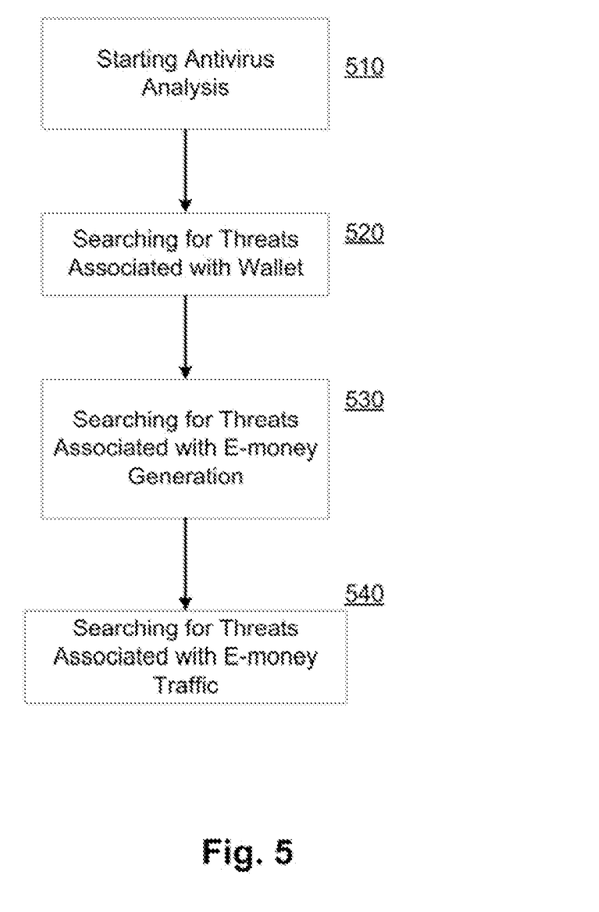
FIG. 5 illustrates a method for malicious programs detection an according to an exemplary aspect.

FIG. 5 illustrates a method for malicious programs detection an according to an exemplary aspect. As shown, detection of malicious programs that can intervene with e-money transaction may be performed via malware detection module 320 which can be part of antivirus application. In step 510, conditions for starting the antivirus check are reviewed, for example, control module 340 can perform this task. Such conditions can include one of the following: (i) detection of suspicious (untrusted) applications (in one aspect, those programs which are not included in whitelist, are considered as untrusted); (ii) clipboard access from untrusted applications; (iii) attempts to access wallet application 110; (iv) user starts antivirus check manually; and (v) on-demand antivirus scanning (as opposed to periodical antivirus scans).

In step 520, a search is executed for possible threats for wallet 110. Such threats can include keyloggers or those malicious applications that take screenshots. Detection is based on finding possible hooks for appropriate functions in the operating system. In step 530, a search is executed for possible threats that are related to the generation of e-money. An example of such a threat can be a Trojan, which uses computer resources to generate e-money without user consent. An example of heuristic signatures for detecting malicious applications to generate electronic money 120*a* may be the following set of attributes: how long an unknown application uses the resources of the GPU (i.e., the "Graphics Processing Unit") and periodically connects to pool server 160. In step 540, a search is performed for the risks posed with access to the network. Examples of such threats are malicious applications 115*a*, which can replace the web page of exchange 140 by a phishing resource when a user attempts to access it, as well as those malicious applications (proxy servers) 115*a*, which can monitor network connections of the wallet application 110 with a network 150 for fraudulent transactions of e-money.

Figure 6:
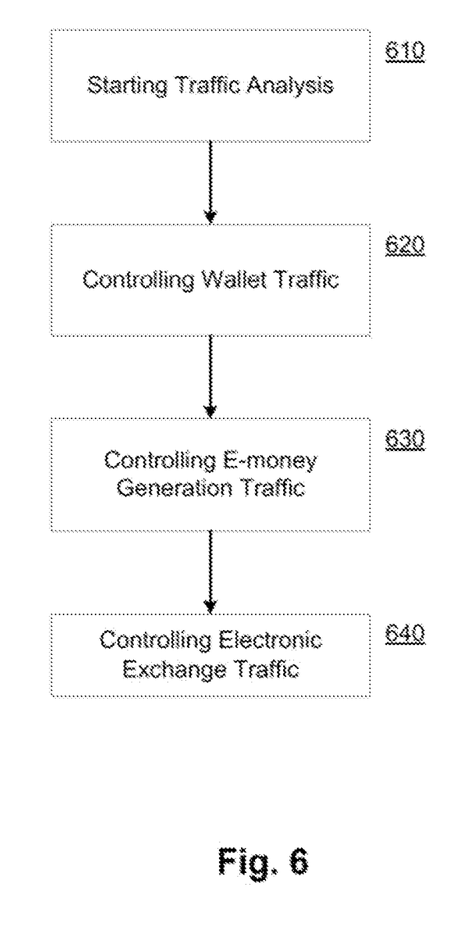
FIG. 6 illustrates a traffic control method according to an exemplary aspect.

FIG. 6 illustrates a traffic control method according to an exemplary aspect. As shown, traffic control module 330 is configured to check all network traffic associated with e-money transactions. As shown, in step 610, traffic control conditions are checked by control module 340, for example. Traffic control conditions can include, but are not limited to, presence of wallet 110, e-money generator 120, electronic exchange 140 history (for example, browser history if access was performed from browser). In step 620, traffic control module 330 controls traffic associated with wallet 110. In another aspect, this step can be carried out by wallet protection module 310, which controls network connections of wallet application 110 with network 150. In yet another aspect, wallet 110 transactions are monitored and untrusted recipients are checked. In step 630, e-money generation traffic is controlled. In order to achieve this goal all network interaction between pool server 160 and e-money generator 120 is monitored and all malicious packets are filtered out and the user is informed. In case of a detection of malicious generation of e-money, malware detection module 320 can be activated to search of possible Trojans on computer. In another aspect, a protocol analyzer may be used to disassemble such protocols as the Stratum mining protocol. In step 640, the traffic this is controlled is associated with exchange 140. In one aspect, the URL-address of exchange 140 is checked for its certificate and other parameters, as described, for example, in U.S. Pat. No. 8,732,472, which is incorporated by reference in its entirety.

Figure 7:
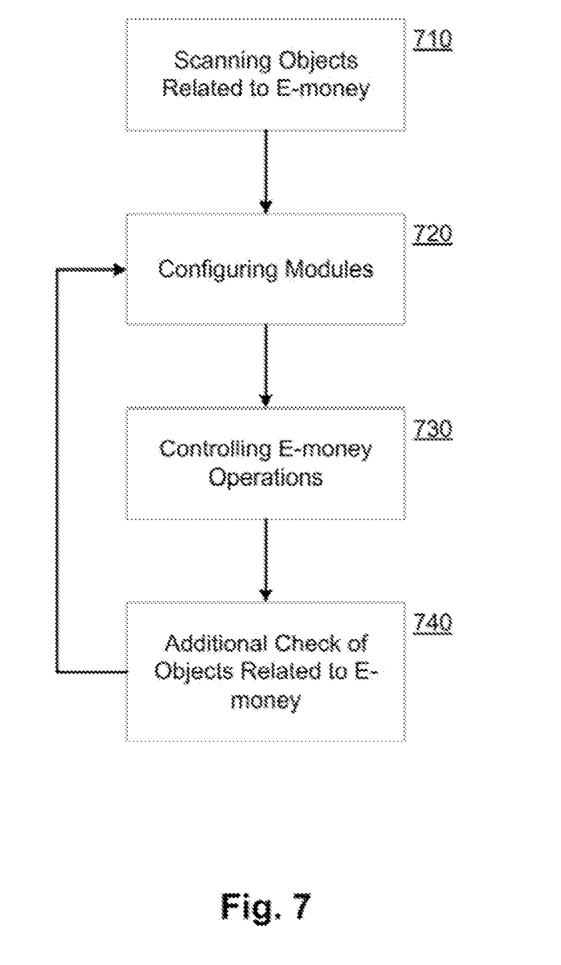
FIG. 7 illustrates a flowchart of an example method of protecting electronic money transactions according to an exemplary aspect.

FIG. 7 illustrates a flowchart of an example method of protecting electronic money transactions according to an exemplary aspect. In step 710, control module 340 initializes wallet protection module 310, malware detection module 320, and traffic control module 330 for protection of possible e-money objects on a computer of a user 100. Such objects can include, but are not limited to, e-money generator 120, wallet 110, electronic exchange 140 histories (for example, browser history if access was performed from browser). Next, in step 720, modules 310-330 are adjusted in order to deliver the best protection for e-money objects. Adjustments can include, but not limited to: tuning wallet protection module 310 for specific wallet 110 and its resources, antivirus databases and settings for malware detection module 320, URL lists and protocol analyzer data for traffic control module 330. In step 730, all actions with e-money are controlled. More details are shown in FIGS. 4-6 and described above. Finally, at step 740, a periodical rescan for e-money objects is performed for additional readjustment of modules 310-330. In one aspect, this step can be associated with updates for modules 310-330.

Protecting the wallet via periodic readjustments (or tuning) may include multiple options. First, it may include controlling the access to file wallet.dat (usually located in the folder %APPDATA%\Bitcoin—an example for crypto currency Bitcoin) from the side of the executable file of the wallet (for example, an executable file for the bitcoin-qt.exe crypto currency Bitcoin). Second, it may include controlling the operations of a running process of the executable file of the wallet, which may include protecting virtual memory (so that it was impossible to make an injection of external malicious code), ensuring secure user input (e.g., using a virtual keyboard) during display of the wallet's GUI, controlling network connections opened by the process. Third, it may include checking the executable file of the wallet for possible substitution by a Trojan using for example digital signatures, hash sums, emulation of the file in order to detect possible external malicious code. Fourth, it may also include updating antivirus database with the information about threats that apply to e-money and e-wallets, and configuring file and web scanners to search for these types of threats (for example, file scanner may be configured to search for specific Trojans, the heuristic analyzer may be configured to check unknown files on the functionality of these Trojans, etc.). Fifth, it may also include checking addresses of e-money exchanges for phishing (checking URL address) or for one of the common valid digital signature (type of attack Man-in-the-Browser).

Figure 8:
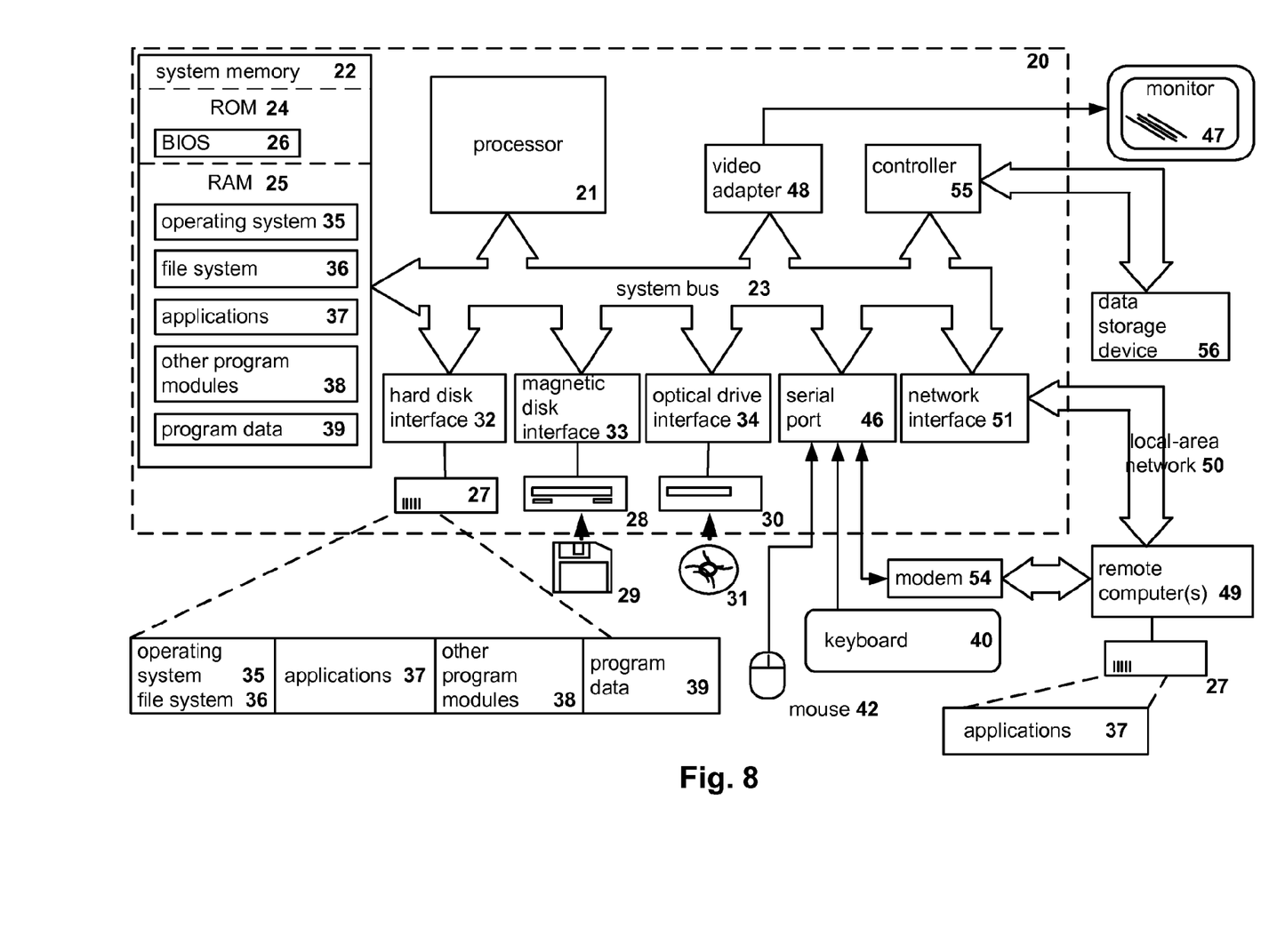
FIG. 8 illustrates an example of a general-purpose computer system (which may be a personal computer or a server) on which the disclosed systems and method can be implemented according to an example aspect.

FIG. 8 illustrates an example of a general-purpose computer system (which may be a personal computer or a server) on which the disclosed systems and method can be implemented according to an example aspect. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for protecting electronic money transactions, comprising:
   scanning a computer to detect software objects associated with electronic money, wherein said software objects include at least one electronic wallet configured to store electronic money and resources used by the electronic wallet to exchange the electronic money;
   providing a set of security modules comprising a wallet protection module configured to provide data security to the detected electronic wallet and resources and a traffic control module configured to analyze protocols and control the transmission of data relating to the exchange of the electronic money by the detected electronic wallet; and
   upon detection of an electronic wallet:
   controlling, by the wallet protection module, access to the resources used by the electronic wallet to protect an exchange of the electronic money by the electronic wallet;
   tracking and protecting execution of the electronic wallet, by the wallet protection module, by monitoring and controlling access to at least one of virtual memory, network connections, and threads used by the electronic wallet, wherein access is reduced upon detection of suspicious activity, and wherein controlling access to virtual memory comprises protecting virtual memory used by a running process of an executable file of the electronic wallet by prohibiting injection of an external malicious code;
   monitoring, by the traffic control module, network connections used by the electronic wallet to determine whether the exchange of electronic money by the electronic wallet is a transmission to an untrusted recipient based on protocol analyzer data obtained from analyzing the network connections; and
   upon determination that the transmission is to an untrusted recipient, controlling, by the traffic control module, the exchange of electronic money between the electronic wallet and the untrusted recipient by at least one of filtering malicious packets or controlling network connections.

2. The method of claim 1, further comprising providing a control module configured to coordinate and automatically update at least one of the settings or functions of the security modules.

3. The method of claim 2, wherein the set of security modules further comprises a malware detection module configured to scan for malware upon at least one of detection of an attempt to access the electronic wallet, direction by the control module or input from a user of the computer.

4. The method of claim 1, further comprising detecting, by a malware detection module, malicious programs that can intervene with an electronic money transaction.

5. The method of claim 1, further comprising scanning, by the traffic control module, network traffic associated with an electronic exchange for the electronic money.

6. A system for protecting electronic money transactions, comprising:
   a hardware processor configured to:
   scan a computer to detect software objects associated with electronic money, wherein said software objects include at least one electronic wallet configured to store electronic money and resources used by the electronic wallet to exchange the electronic money;
   provide a set of security modules comprising a wallet protection module configured to provide data security to the detected electronic wallet and resources and a traffic control module configured to analyze protocols and control the transmission of data relating to the exchange of the electronic money by the detected electronic wallet; and
   upon detection of an electronic wallet:
   control, by the wallet protection module, access to the resources used by the electronic wallet to protect an exchange of the electronic money by the electronic wallet;
   track and protect execution of the electronic wallet, by the wallet protection module, by monitoring and controlling access to at least one of virtual memory, network connections, and threads used by the electronic wallet, wherein access is reduced upon detection of suspicious activity, and wherein controlling access to virtual memory comprises protecting virtual memory used by a running process of an executable file of the electronic wallet by prohibiting injection of an external malicious code;
   monitor, by the traffic control module, network connections used by the electronic wallet to determine whether the exchange of electronic money by the electronic wallet is a transmission to an untrusted recipient based on protocol analyzer data obtained from analyzing the network connections; and
   upon determination that the transmission is to an untrusted recipient, control, by the traffic control module, the exchange of electronic money between the electronic wallet and the untrusted recipient by at least one of filtering malicious packets or controlling network connections.

7. The system of claim 6, wherein the hardware processor is further configured to provide a control module configured to coordinate and automatically update at least one of the settings or functions of the security modules.

8. The system of claim 7, wherein the hardware processor is further configured to provide a malware detection module as part of the set of security modules, configured to scan for malware upon at least one of detection of an attempt to access the electronic wallet, direction by the control module or input from a user of the computer.

9. The system of claim 6, further comprising a malware detection module configured to detect malicious programs that can intervene with an electronic money transaction.

10. The system of claim 6, wherein the traffic control module is configured to scan network traffic associated with an electronic exchange for the electronic money.

11. A non-transitory computer readable medium storing computer executable instructions for protecting electronic money transactions, including instructions for:
   scanning a computer to detect software objects associated with electronic money, wherein said software objects include at least one electronic wallet configured to store electronic money and resources used by the electronic wallet to exchange the electronic money;
   providing a set of security modules comprising a wallet protection module configured to provide data security to the detected electronic wallet and resources and a traffic control module configured to analyze protocols and control the transmission of data relating to the exchange of the electronic money by the detected electronic wallet; and upon detection of an electronic wallet:

controlling, by the wallet protection module, access to the resources used by the electronic wallet to protect an exchange of the electronic money by the electronic wallet;

tracking and protecting execution of the electronic wallet, by the wallet protection module, by monitoring and controlling access to at least one of virtual memory, network connections, and threads used by the electronic wallet, wherein access is reduced upon detection of suspicious activity, and wherein controlling access to virtual memory comprises protecting virtual memory used by a running process of an executable file of the electronic wallet by prohibiting injection of an external malicious code;

monitoring, by the traffic control module, network connections used by the electronic wallet to determine whether the exchange of electronic money by the electronic wallet is a transmission to an untrusted recipient based on protocol analyzer data obtained by analyzing the network connections; and upon determination that the transmission is to an untrusted recipient, controlling, by the traffic control module, the exchange of electronic money between the electronic wallet and the untrusted recipient by at least one of filtering malicious packets or controlling network connections.

12. The non-transitory computer readable medium of claim 11, further including instructions for coordinating and automatically updating, by a control module, at least one of the settings or functions of the security modules.

13. The non-transitory computer readable medium of claim 11, further including instructions for scanning, by a malware detection module, for malware upon at least one of detection of an attempt to access the electronic wallet, direction by the control module, or input from a user of the computer.

14. The non-transitory computer readable medium of claim 11, further including instructions for detecting, by a malware detection module, malicious programs that can intervene with an electronic money transaction.

* * * * *